United States Patent [19]

Dauvergne

[11] Patent Number: 4,846,591

[45] Date of Patent: Jul. 11, 1989

[54] ROTARY BEARING FOR A GLASS-RAISING ARM OF A MOTOR VEHICLE

[75] Inventor: Jean Dauvergne, Fosses, France

[73] Assignee: Rockwell-Cim, France

[21] Appl. No.: 184,645

[22] Filed: Apr. 22, 1988

[30] Foreign Application Priority Data

Apr. 21, 1987 [FR] France ................................. 87 05628

[51] Int. Cl.⁴ ..................... F16C 33/10; E05D 11/02; E05F 11/46
[52] U.S. Cl. ..................................... 384/322; 16/274; 49/351; 384/440; 403/39; 403/163
[58] Field of Search ............... 384/129, 322, 372, 374, 384/380, 381, 385, 391, 397, 440, 154–156, 2; 403/39, 163; 49/351, 350, 349; 16/274, 273, DIG. 27

[56] References Cited

U.S. PATENT DOCUMENTS

| | | | |
|---|---|---|---|
| 3,231,301 | 1/1966 | Gray | 384/125 X |
| 3,854,829 | 12/1974 | Nakano et al. | 403/162 |
| 3,897,652 | 8/1975 | Hess | 403/164 X |
| 4,414,779 | 11/1983 | Ishii | 49/351 |

Primary Examiner—Thomas R. Hannon

[57] ABSTRACT

The rotary bearing assembles a first arm with a second arm (14) provided with a cylindrical throughway opening (20) which receives a journal constituted by a first cylindrical shoulder (22) projecting from the lateral surface (24) of the first arm and a second cylindrical shoulder (26) which projects from a member (16) forming a bearing plug, the two shoulders (22, 26) being mechanically interconnected by their confronting planar surfaces (30, 32) so as to trap the second arm. One of the shoulders (22) has an axial orifice (34) for introducing a lubricating agent and opening onto the planar surface of the shoulder (30) for supplying the lubricating agent to a distribution passage (38, 40) which is formed in at least one of the two planar surfaces (30, 32) and communicates with the periphery of the journal.

5 Claims, 2 Drawing Sheets

ROTARY BEARING FOR A GLASS-RAISING ARM OF A MOTOR VEHICLE

The present invention relates to a rotary bearing for mounting a first arm on a second arm provided with a throughway cylindrical opening which receives a journal constituted by a first cylindrical shoulder projecting from the lateral surface of the first arm and a second cylindrical shoulder projecting from a member forming a bearing plug, the two shoulders being mechanically interconnected by their confronting planar surfaces in such manner as to trap said second arm.

The invention more particularly relates to a rotary bearing of the type just described employed in a glass-raising device for a motor vehicle comprising two arms arranged in an X configuration disposed within the door of the vehicle and supporting the corresponding glass. One of the these two arms is a driving arm and the other a driven arm, the driving arm being fixed at one of its ends to a support capable of being driven in rotation.

These two arms are usually made from sheet metal, the driven arm being constituted by two parts located on each side of the driving arm and on each of which is formed a cylindrical shoulder. When the two parts are assembled, the two cylindrical shoulders are mechanically interconnected by a resistance welding operation. In this type of application, the rotary bearing produced in this way is subjected, during the life of the vehicle, to very high corrosion attack, in particular owing to the salty mist phenomenon. In the course of the welding operation, the initial protection of the sheets, for example covered by galvanization, is very often damaged and is no longer sufficient to ensure suitable protection of the bearing against corrosion. The corrosion phenomenon, and in particular the formation of zinc salts, results in a "swelling" of the journal which may result in a jamming of the bearing.

An object of the present invention is to provide a rotary bearing which is simple in construction but permits, by the introduction of a lubricating and protective agent, after the mechanical interconnection of the various components of the bearing, ensuring a long-term protection of the bearing.

The invention therefore provides a rotary bearing, wherein one of said shoulders comprises an axial orifice for introducing a lubricating agent which opens onto the planar surface of the shoulder for supplying lubricating agent to a distribution passage formed in at least one of the two planar surfaces and communicating with the periphery of the journal.

With this arrangement, a lubricating agent, for example grease, under pressure, may be introduced through the axial orifice, this agent, in travelling through the distribution passage, entering the bearing proper, i.e. between the outer cylindrical surface of the journal and the confronting cylindrical surface of the opening, and then being capable of spreading over the lateral surfaces of the first arm around the rotary bearing so as to fully protect the active surfaces against risks of corrosion.

Further features and advantages of the invention will be apparent from the following description with reference to the accompanying drawings, in which.

Figure 2:
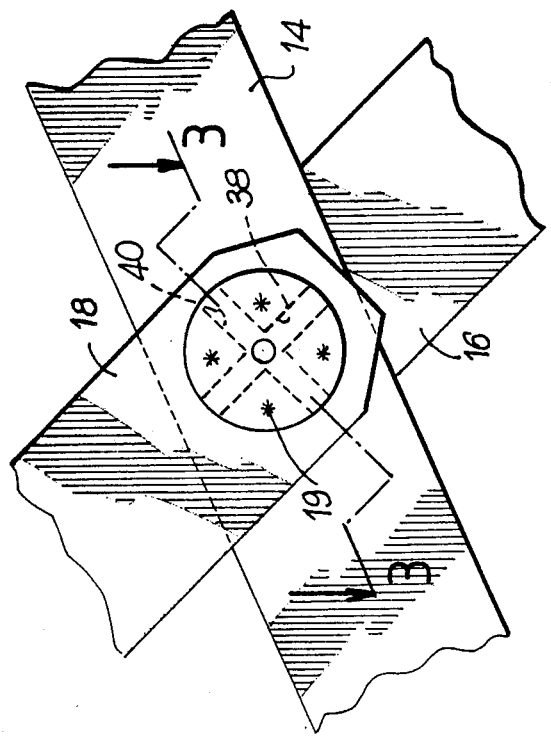
FIG. 2 is a view to an enlarged scale of a rotary bearing arranged in accordance with the teaching of the present invention for the articulation of the arms of the glass-raising device of FIG. 1.
Figure 3:
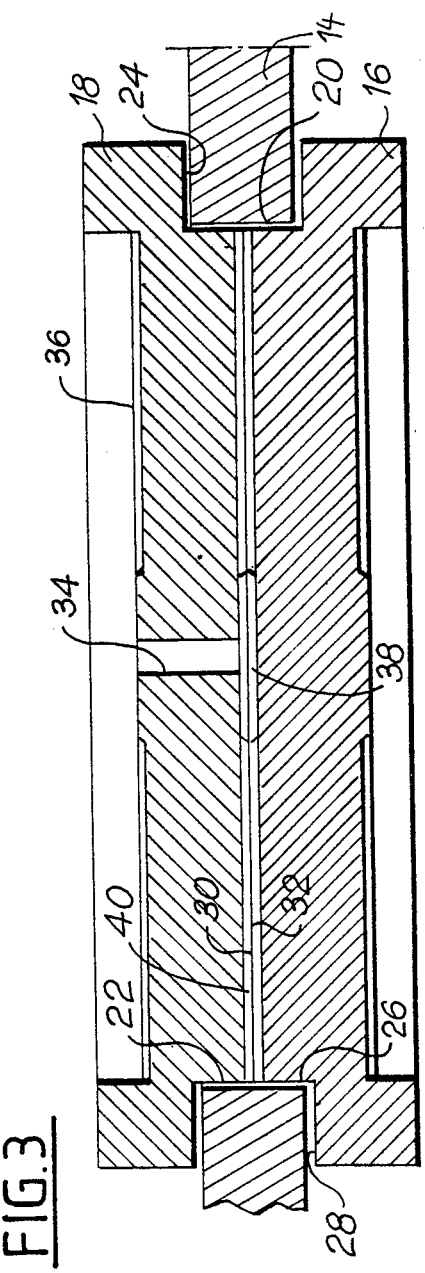

FIG. 3 a sectional view, to a very large scale, taken on line 3—3 of FIG. 2.

Figure 1:
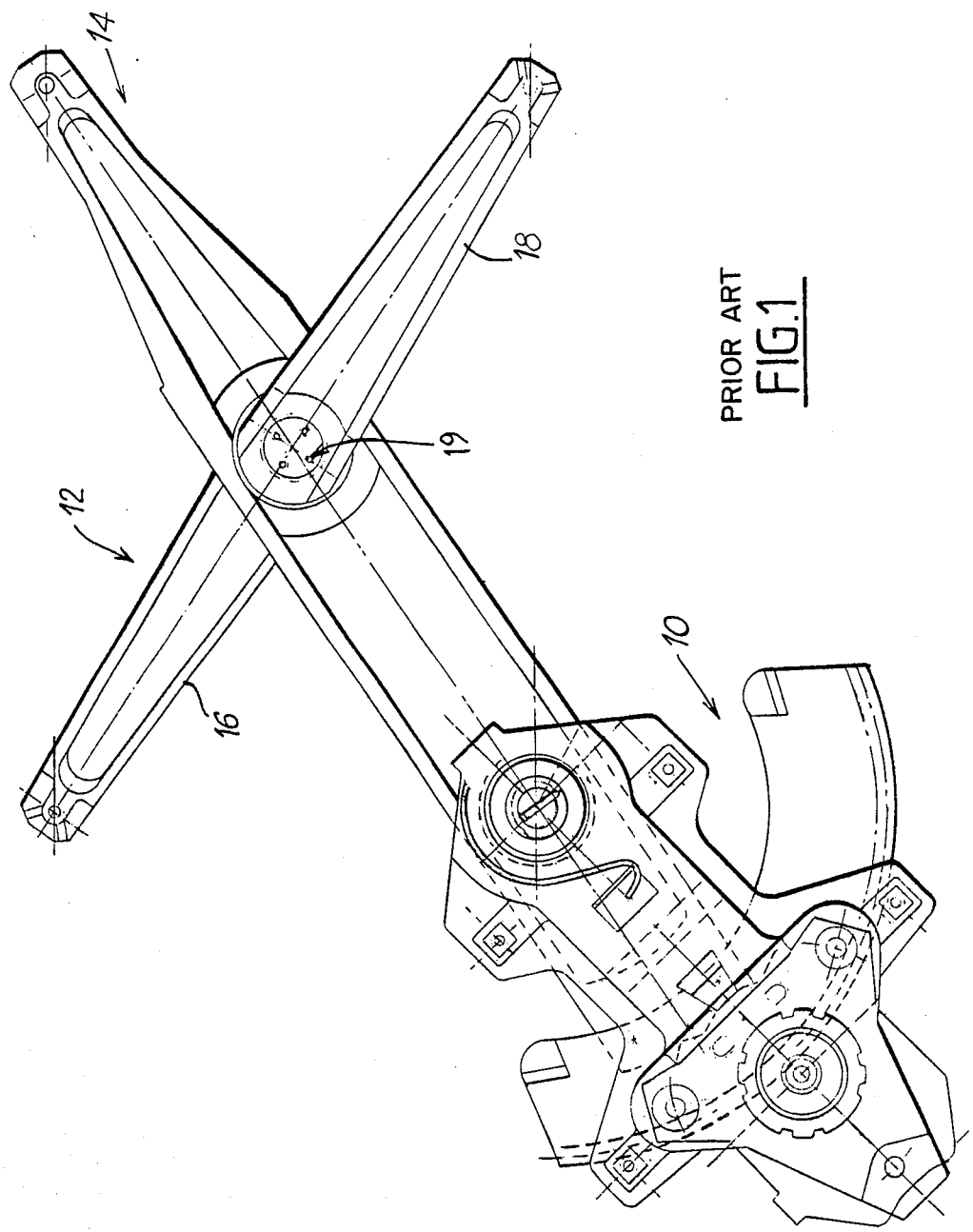
FIG. 1 is a view of an electric glass-raising device for a motor vehicle of the prior art.

There is shown in FIG. 1 an electric glass-raising device 10 for a motor vehicle which comprises two arms 12 and 14 located within the door (not shown) of the vehicle. The first arm 12 is a driven arm made in two parts, namely a semi-arm 16 and a semi-arm 18 which are welded together by resistance spot-welding 19. Conventionally, the two semi-arms 16 and 18 are interconnected by two cylindrical portions obtained by a partial cutting of the sheet of the arms by means of a suitable press tool, these cylindrical portions extending into a cylindrical throughway opening in the driving arm 14 so as to constitute a rotary bearing.

There is shown in a simplified manner in FIGS. 2 and 3 a rotary bearing for the assembly of the arms of a window-raising device arranged in accordance with the teaching of the present invention. The second arm 14, namely the driving arm, comprises a cylindrical throughway opening 20 obtained by a piercing operation when blanking out the arm 14 from the sheet metal from which the arm is made. The first arm, or driven arm, 12, comprises two semi-arms both of which are also blanked out from a metal sheet. At one of its ends, the semi-arm 18 of the first arm has a first cylindrical shoulder 22 which projects from its planar lateral surface 24 and extends into the cylindrical opening 20 in the arm 14 so as to constitute one of the parts of a cylindrical journal of the rotary bearing. The first cylindrical shoulder 22 is also obtained by a partial cutting of the sheet by means of a suitable press tool when the semi-arm 18 is blanked out and formed from the metal sheet from which it is made.

In order to complete the journal of the bearing and to trap or retain the sheet of the arm 14, the semi-arm 16, which constitutes the bearing plug, also has a cylindrical shoulder 26 which projects from its planar lateral surface 28. The second cylindrical shoulder 26 is produced in the same way as the first cylindrical shoulder 22.

The two cylindrical shoulders 22 and 26 are mechanically interconnected by a resistance welding which mechanically interconnects their two respective planar surfaces 30 and 32 disposed in confronting relation so as to trap the sheet of the arm 14 while providing a slight axial clearance for the bearing as can be seen in FIG. 3. Likewise, the cylindrical shoulders 22 and 26 have a common diameter which is slightly smaller than the diameter of the throughway opening 20 so as to provide a slight radial clearance for the bearing.

According to the present invention, the cylindrical shoulder 22 of the semi-arm 18 has an axial orifice 34 for introducing a lubricating and protective agent. The orifice 34, which is also formed in the course of the blanking operation forming the semi-arm 18, extends axially at the geometric center of the cylindrical shoulder 22 from the planar surface 36 of the semi-arm 18 to the planar surface 30 of the cylindrical shoulder 22. The orifice 34 opens onto the planar surface 30 so as to supply lubricating agent to two distribution passages 38 and 40. In the embodiment shown in FIGS. 2 and 3, the distribution passages 38 and 40 are two diametrical passages which are perpendicular to each other and communicate by their diametrically opposed ends with the periphery of the journal of the bearing constituted by the two cylindrical shoulders 22 and 26.

In the embodiment represented in FIG. 3, the distribution passages 38 and 40 are formed symmetrically in each of the two planar surfaces 30 and 32 of the cylindrical journals 22 and 26. This arrangement permits markedly increasing the passage section of the passages 38 and 34 without increasing the complexity of the realization of the sheet metal component parts, the passages being obtained by means of an impression in the course of the sheet blanking and piercing operations.

The two cylindrical shoulders are interconnected by resistance welding, the spot welds 19 being arranged in the regions of the planar surfaces 30 and 32 which are devoid of the passages 38 and 40, as shown in FIG. 2.

The present invention is not intended to be limited to the embodiment just described and may broadly differ therefrom, in particular as concers the distribution passages which may have different shapes and arrangements for supplying the lubricating agent introduced under pressure in the orifice 34, to the cylindrical periphery of the bearing journal, as explained hereinbefore. Increasing the sections and the number of distribution passages may also increase the quantity of grease introduced for constituting a larger reserve supply of lubricating and protective agent.

What is claimed is:

1. A rotary bearing for assembling a first arm with a second arm, said bearing comprising a cylindrical throughway opening in said second arm, a member constituting a bearing plug, a journal comprising a first cylindrical shoulder projecting from a lateral surface of said first arm and a second cylindrical shoulder projecting from said bearing plug, the two shoulders having confronting planar end surfaces and being mechanically interconnected by said confronting planar surfaces with said second arm being trapped between said first arm and said plug, one of said shoulders including an axial orifice opening onto the planar surface of said one shoulder, a distribution passage formed in at least one of said two planar surfaces and communicating with the periphery of the said journal, said orifice being provided for introducing a lubricating agent and supplying said lubricating agent to said passage.

2. A bearing according to claim 1, wherein each of said two planar surfaces includes at least one lubricating agent distribution passage connecting said orifice to the periphery of the journal.

3. A bearing according to claim 1, wherein two of said distribution passage are provided and disposed perpendicular to each other, said orifice opening onto the centre of said one cylindrical shoulder.

4. A bearing according to claim 1, wherein said two arms and said bearing plug are made from a metal sheet, said two planar surfaces of said shoulders being interconnected by a welding.

5. A bearing according to claim 1, wherein the bearing plug is a member in the shape of an arm which is thus connected to said first arm for constituting a single arm unit pivotally assembled with said second arm.

* * * * *